United States Patent [19]

Blok

[11] 3,904,827

[45] Sept. 9, 1975

[54] SYSTEM FOR LOCATING FAULTY LINE REPEATERS OF REPEATER STATIONS IN A TRANSMISSION LINE

[75] Inventor: Huibert Blok, Hilversum, Netherlands

[73] Assignee: U.S. Philips Corporation, New York, N.Y.

[22] Filed: Aug. 15, 1973

[21] Appl. No.: 388,387

[30] Foreign Application Priority Data

Aug. 24, 1972 Netherlands .......................... 7211531

[52] U.S. Cl. .......................................... 179/175.31 R

[51] Int. Cl. ............................................. H04b 3/46

[58] Field of Search ...... 179/175.31 R, 2.5 R, 2.5 A

[56] References Cited

UNITED STATES PATENTS

| | | | |
|---|---|---|---|
| 3,450,847 | 6/1969 | Barnes | 179/175.31 R |
| 3,557,323 | 1/1971 | Chalhoub | 179/175.31 R |
| 3,560,670 | 2/1971 | Heyes et al. | 179/175.31 R |

*Primary Examiner*—Thomas A. Robinson
*Attorney, Agent, or Firm*—Frank R. Trifari; Henry I. Steckler

[57] ABSTRACT

A system for locating faulty line repeaters includes continuously operating test tone generating oscillators which are arranged in groups of test sections. Two successive groups are separated from each other by an intermediate repeater station, these groups generating test tones having equal frequencies and the test tone generating oscillators of a group being tuned to mutually different frequencies. Each intermediate station comprises a separation filter which does not pass the test tones. A test tone generating oscillator characterizing the intermediate station and a modulator for transposing the test tones from the preceding groups to a frequency band which can pass said separation filter are located in each intermediate station. They indicate to a receiving device when a fault has occurred.

5 Claims, 4 Drawing Figures

SYSTEM FOR LOCATING FAULTY LINE REPEATERS OF REPEATER STATIONS IN A TRANSMISSION LINE

The invention relates to a system for locating faulty line repeaters of repeater stations in a transmission line of a telecommunication system, comprising continuously operating oscillators for generating a test tone each, each oscillator being coupled to the input of a line repeater, and a receiving and monitoring device connected to the transmission line for continuously indicating received test tones.

In a known system of this kind the generated test tones are mutually distinguished in frequency and are all transmitted through the transmission line to said receiving and monitoring device. With respect to the systems in which an oscillator is activated by a command signal for transmission of the test tone to the receiving and monitoring device such a system has, for example, the important advantage that an auxiliary lead is not required for the transmission of any command signal and that the line repeaters are continuously supervised so that it can be immediately found out whether there is a faulty or inoperative line repeater. In addition, the position of this faulty line repeater can be found by using the test tones which are mutually different in frequency.

Although the above-described system for locating faulty repeaters has the above-mentioned special advantages, use of this system is, however, limited because its complexity greatly increases with the number of repeater stations and hence with the length of the transmission line.

It is an object of the invention to provide a system for the fault localising system location of faulty line repeaters, of the kind described in the preamble, having its complexity considerably reduced while maintaining the above-mentioned special advantages and having considerably extended possibilities of use.

To this end the system according to the invention is characterized in that the oscillators coupled to the inputs of successive line repeaters are arranged in groups of test sections. The oscillators of a group generate test tones having mutually unequal frequencies, while the oscillators of successive groups generate test tones having mutually equal frequencies. Successive groups are separated from each other by an intermediate repeater station provided with a separation filter having a given pass band. Test tones generated by the group directly preceding such an intermediate repeater station are transmitted to said station through the transmission line in a frequency band located beyond the pass band of the separation filter. The oscillators in said intermediate repeater stations generate test tones having mutually unequal frequencies, which are located within the pass band of the separation filters and are continuously transmitted to said receiving and monitoring device. Said intermediate repeater stations each includes a modulator for transposing the test tones applied to said repeater stations to a frequency band located within the pass band of the separation filters for transmitting these test tones to the receiving and monitoring device.

The steps according to the invention have led to a system for which a number of frequency-different test tones may suffice which is considerably smaller than the number of repeater stations in the transmission line, for example, a factor of 10 to 20 so that this system can also be used in a transmission line for signal transmission in a broad frequency band over large distances, for example, 1000 kms and more.

The invention and its advantages will now be described in greater detail with reference to the figures.

FIG. 1 diagrammatically shows a telecommunication system using the system according to the invention;

Figure 1:
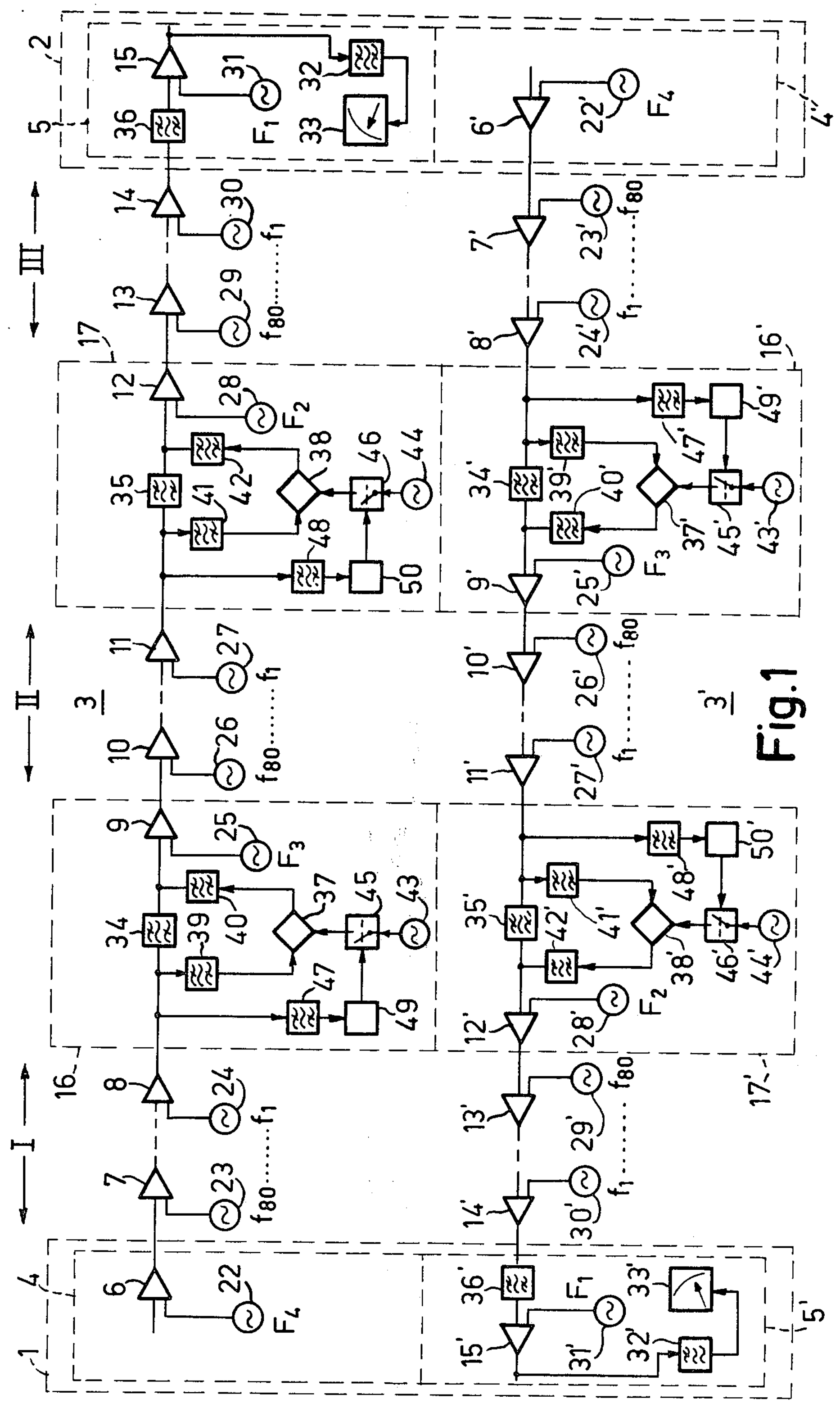

FIG. 1 shows a carrier telephony system for the transmission of information signals between two terminal stations 1 and 2 through coaxial leads 3 and 3' in a frequency band of 3.5 – 60 MHz. Each terminal station 1, 2 comprise a carrier telephone first terminal station 4, 4' and a carrier telephone end-terminal station 5, 5'. The transmission of carrier telephone signals from first terminal station 4 to end-terminal station 5 through lead 3 and from first terminal station 4' to end-terminal station 5' through lead 3' is effected in the same manner so that only the transmission through lead 3 will be considered hereinafter. In the Figure the elements incorporated in lead 3' have the same reference numerals as the corresponding elements in lead 3, but they are provided with primes.

In the carrier telephone system shown the carrier telephone signals originating from the first terminal station 4, which comprises line repeater 6, are transmitted through line repeaters 7–14 incorporated in repeater stations and for signals in said frequency band located at distances of 1.5 kms, to the end-terminal station 5 which comprises line repeater 15.

Figure 2:
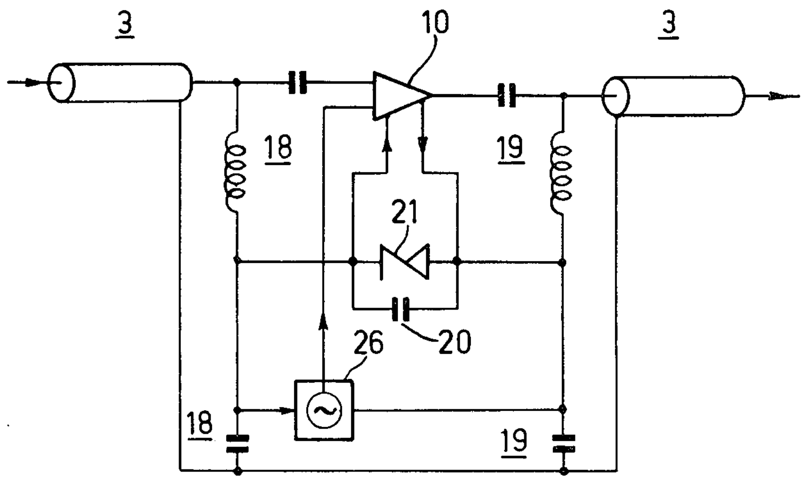
FIG. 2 shows in greater detail a repeater station used in the telecommunication system of FIG. 1.

Although in FIG. 1 the line repeaters of only eight repeater stations are shown between the first terminal station 4 and the end-terminal station 5, this number is much larger in practice. More particularly each repeater station is built up in the manner as is illustrated in greater detail in FIG. 2 for the repeater station with line repeater 10. As is shown in FIG. 2, said line repeater is connected through two power separation filters 18 and 19 to the transmission line 3 formed as a coaxial cable. The filters 18 and 19 separate the supply current transmitted through the transmission path of the information signals and are connected together through a Zener diode 21 shunted by a capacitor 20 and having its terminals connected to the direct supply current input terminals of the line repeater 10.

To supervise the connection between the first terminal station 4 and the end-terminal station 5 and particularly for locating a faulty or inoperative line repeater the carrier telephone system considered is provided with continuously operating oscillators 22–31 which are incorporated in the repeater stations in a manner as is illustrated in greater detail in FIG. 2. To indicate faulty or inoperative line repeaters the system is also provided with a receiving and monitoring device 32, 33 connected to the transmission line. In the embodiment shown the receiving and monitoring device 32, 33 are accommodated in the end-terminal station 5. Moreover the receiving device is constituted by a filter connected to the output of the line repeater 15 for selecting the test tones.

For supervision of a carrier telephone system in which the end-terminal station 5 comprising the receiving and monitoring device is located at a large distance, for example, 1000 kms or more from the first terminal station 4, according to the invention the oscillators coupled to the inputs of successive line repeaters are arranged in groups of test sections only three of which are shown in the Figure and are denoted by I, II and III. The oscillators within each group generate test tones of mutually unequal frequencies. The oscillators of successive groups generate fault localising signals which are test tones having mutually equal frequencies. Successive groups are separated from each other by intermediate repeater stations 16 and 17 provided with separation filters 34, 35 having a given pass band. The test tones generated by the groups I, II directly preceding such an intermediate repeater stations 16, 17, respectively, are transmitted to these stations through the transmission line in a frequency band located beyond the pass band of the separation filter. The oscillators 25 and 28 in the intermediate repeater stations 16, 17 generate test tones having mutually unequal frequencies, located within the pass band of the separation filters, and are continuously transmitted to the receiving and monitoring device 32, 33. Said intermediate repeater stations 16, 17 each includes a modulator 37, 38 respectively, for transposing the test tones located beyond the pass band of the separation filters 34, 35 and which tones are applied to this repeater station to a frequency band located within this pass band for transmitting these test tones to the receiving and monitoring device 32, 33. More particularly, the respective modulators 37 and 38 are connected to the transmission path through selective filters 39, 40 and 41, 42, the filters 39 and 41 selecting the test tones of groups I and II, repectively, from the signals of the transmission line and carrier signals being applied to the modulators 37, 38. In the given embodiment these carrier signals are derived from carrier oscillators 43 and 44 tuned to mutually equal frequencies and the oscillators 22, 25, 28 and 31 are connected directly to the inputs of the associated line repeaters. The test tones generated within each of the test sections I, II and III mutually differ in frequency, for example, 1 kHz. Said test tones are transmitted in a frequency band of, for example 3.2–3.3 MHz to the stations 16, 17 and the end-terminal station 5. This end-terminal station 5, likewise as the stations 16 and 17, is provided with a filter 36 which separates the test tones generated in group III from the information signals. The pass band of this filter 36 as well as the pass band of the filters 34 and 35 is located above the frequency band of the test tones and is equal to the frequency band of from 3.5 – 60 MHz of the information signals.

The test sections I, II and III in this embodiment each comprise, for example, 80 oscillators which are tuned to the frequencies $f_1 - f_{80}$ but of which per section only two, namely 23, 24; 26, 27; 29, 30 have been shown for the sake of simplicity, i.e., the last and the first oscillators of a section tuned to $f_{80}$ and $f_1$, respectively.

In the embodiment shown the test tones indicative of the intermediate stations 16 and 17, the first and end-terminal station and having mutually different frequencies are generated by the oscillators 25 and 28 in the intermediate stations 16 and 17 and by the oscillators 22 and 31 in the first terminal station 4 and the end-terminal station 5, respectively. In this embodiment these test tones are each applied directly through an input of the associated line repeater to the transmission line and the oscillators 22, 25, 28 and 31 are tuned to mutually different frequencies which are denoted in the Figure by $F_1$, $F_2$, $F_3$ and $F_4$ and are located within the pass band of the separation filters 34–36, for example, in the frequency band of from 3.7–3.75 MHz.

The test tones generated by the oscillators 22, 25, 28 and 31 for continuous supervision of the line repeaters are thus transmitted continuously through the transmission line to the receiving and monitoring devices but the test tones generated by the oscillators of a test section are transmitted to the receiving and monitoring device after transposition to the frequency band of from 3.5–60 MHz. More particularly in this embodiment the test tones of all groups are transposed to the same frequency band, namely to the frequency band of from 3.5–3.6 MHz when using carrier signals of, for example, 300 kHz.

For locating a faulty or inoperative line repeater the carrier oscillators 43 and 44 are connected to the modulators 37, 38, through switching arrangements 45, 46, respectively. These switching arrangements 45, 46 are each controlled by a control signal transmitted through the transmission path, which signal is selected from the transmitted information signals by selective filters 47, 48 connected to the transmission line. This control signal is more particularly constituted by a pilot signal which is used for controlling the amplification of so-called controlled line repeaters. Such a pilot signal is generated in a manner not further shown in the Figure with the aid of pilot generators in the first terminal station 4 and the intermediate stations 16 and 17 and is transmitted through the tranmission line to the intermediate stations 16 and 17 and the end-terminal station 5, respectively. To control the switching arrangements 45 and 46 the pilot signals of, for example, 3 MHz each transmitted by the first terminal station and the station 16 are applied after selection by the filters 47 and 48 to comparators 49, 50, respectively, for comparing the levels of received pilot signals with a given reference level. These comparators 49 and 50 may be formed, for example, as difference amplifiers.

When as a result of an inoperative line repeater in, for example, section II the level of the associated pilot signal has decreased to below the reference level, the output signal from the comparator 50 connects the carrier oscillator 44 through the switching arrangement 46 to the carrier input of the modulator 38 so that the test tones from group II are transposed to the pass band of the separation filters 35 and 36 and are transmitted to the end-terminal station 5 where the absence of test tones from the group is indicated by the monitoring device 33 which has already monitored the absence of the continuously transmitted test tones $F_3$ and $F_4$ and hence the group (II) from which the incoming test tones originate.

The steps according to the invention have led to a system capable of locating a faulty or inoperative line repeater from one of the end-terminal stations of the carrier telephony system over a principally unlimited large distance between the two end-terminal systems with only a limited number of frequency-different test tones. This number is, for example, 90 for 1200 km long transmission line in which the line repeaters are placed at mutual distances of 1.5 kms and the intermediate repeater stations are spaced apart over 120 kms.

The system for locating a faulty line repeater according to the invention is not limited to the embodiment described in the foregoing. For example, the said control signals for the switching arrangements 45 and 46 may alternatively be generated in one of the end-terminal stations and may be transmitted from these station to the different intermediate repeater stations. For example, these control signals may be generated in the end-terminal station 2 and may be transferred against the transmission direction through the transmission line 3 in the manner described, for example, in detail in prior U.S. Pat. No. 3,766,337. More particularly these control signals are transmitted through the power separation filters 18 and 19 and capacitor 20 shown in FIG. 2. In such an embodiment the selective filters 47 and 48 are connected to the connection point between one of the terminals of the Zener diode 21 shown in FIG. 2 and one of the power separation filters 18, 19.

Figure 3:
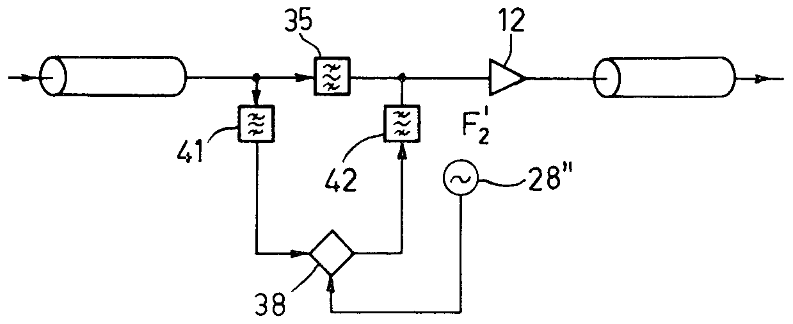
FIG. 3 shows a simplified embodiment of an intermediate repeater station.

A very simple embodiment of the intermediate repeater stations is shown in FIG. 3 for the intermediate repeater station with line repeater 12. Also this station is provided with a separation filter 35, a modulator 38 which is connected in parallel with the separation filter 35 to the transmission line through the two selective filters 41 and 42 and an oscillator 28'' generating a test tone of frequency $F_2$, which frequency $F_2$ is different for each of the intermediate repeater stations. This embodiment of the intermediate repeater stations is distinguished, however, from the embodiment shown in FIG. 1 in that the output signal from the oscillator 28'' is applied as a carrier signal to the carrier input of the modulator 38. The simplification consists in that the carrier oscillator, for example, 44 of FIG. 1, the switching arrangement 46 and the control elements 48 and 50 for the switching arrangement are omitted in each of these intermediate repeater stations.

It is achieved by the intermediate repeater stations formed in this way that the test tones from the successive test sections are transmitted continuously and in mutually different frequency bands to the receiving and monitoring device.

Figure 4:
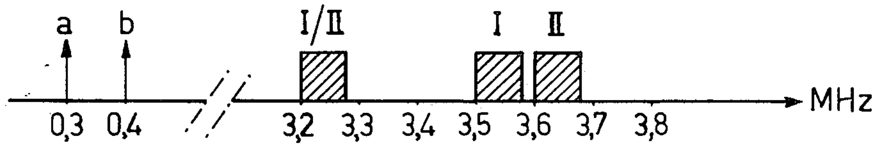
FIG. 4 shows a frequency diagram to explain the operation of the station of FIG. 3.

FIG. 4 shows by means of a frequency diagram the operation of two of such simple intermediate repeater stations whose associated oscillators generate test tones at 0.3 and 0.4 MHz respectively. The output signals from the oscillators denoted by *a* and *b* in this Figure transpose the test tones generated by the preceding groups I and II and for both groups located in the same frequency band of 3.2–3.28 MHz denoted by I/II in the Figure to the separate frequency bands of 3.5–3.58 MHz and 3.6–3.68 MHz denoted by I and II in the Figure in which separate frequency bands the test tones from groups I and II, respectively, are transmitted to the receiving and monitoring device.

For completeness' sake it is to be noted that, although FIG. 1 does not further show this, also the end-terminal station 5 may be equipped with a modulator for locating a faulty line repeater in group III, but this may be alternatively effected by connecting the output of the line repeater 14 through, for example, a manually operated switch to the input of the selective filter 32 of the receiving and monitoring device 32, 33.

What is claimed is:

1. System for locating faulty line repeaters of repeater stations in a transmission line of a telecommunication system, comprising continuously operating oscillators for generating a test tone each, each oscillator being coupled to the input of a line repeater, and a receiving and monitoring device connected to the transmission line for continuously indicating received test tones, characterized in that the oscillators coupled to the inputs of successive line repeaters are arranged in groups of test sections; each of the oscillators within a group generating test tones having unequal frequencies with respect to the other oscillators in said group; each of the oscillators of successive groups generating test tones having equal frequencies with respect to preceding groups; successive groups being separated from each other by an intermediate repeater station provided with a separation filter having a given pass band, test tones generated by the group directly preceding such an intermediate repeater station being transmitted to said station through the transmission line in a frequency band located beyond the pass band of the separation filter, the oscillators in said intermediate repeater stations generating test tones having mutually unequal frequencies, located within the pass band of the separation filters; and being continuously transmitted to said receiving and monitoring device; said intermediate repeater stations each including a modulator for transporting the test tones applied to said repeater stations to a frequency band located within the pass band of the separation filters for transmitting these test tones to the receiving and monitoring device.

2. System as claimed in claim 1, characterized in that in each intermediate repeater station the output of the test tone generating oscillator is directly applied to the input of the associated line repeater; said intermediate repeater stations each including a carrier oscillator connected through a switching arrangement to an input of the modulator, said switching arrangement being controlled by a control signal transmitted through the transmission line, said carrier oscillator being mutually tuned to equal frequencies.

3. System as claimed in claim 1, characterized in that in each intermediate repeater station the test tones from the directly preceding group are applied to the modulator as modulating signals and to which the output modulator is also applied as a carrier signal the output signal from the test tone generating oscillator of the intermediate repeater station, the output signal of the modulators transmitting the test tones from successive groups in mutually different frequency bands to the receiving and monitoring device.

4. System as claimed in claim 1, characterized in that in each intermediate repeater station an input of the modulator is connected through a selective filter and an output is connected through an output filter in parallel with the associated separation filter to the transmission line.

5. A method for locating faulty line repeaters of test groups of repeater stations in a transmission line, said method comprising transmitting test tones along said line from each of said stations to intermediate stations between said groups, tones within each of said groups being unequal in frequency with respect to other tones in said group, tones in successive groups being equal with respect to tones in preceding groups, continuously monitoring said tones at a receiving device, transmitting from each of said intermediate stations tones of mutually unequal frequencies, and frequency transposing the preceding repeater station tones at each intermediate station succeeding said groups respectively for transmission to said receiving device.

* * * * *